(12) United States Patent
Kyrtsos

(10) Patent No.: US 6,202,020 B1
(45) Date of Patent: Mar. 13, 2001

(54) METHOD AND SYSTEM FOR DETERMINING CONDITION OF ROAD

(75) Inventor: Christos Kyrtsos, Southfield, MI (US)

(73) Assignee: Meritor Heavy Vehicle Systems, LLC, Troy, MI (US)

(*) Notice: Subject to any disclaimer, the term of this patent is extended or adjusted under 35 U.S.C. 154(b) by 0 days.

(21) Appl. No.: 09/378,101

(22) Filed: Aug. 20, 1999

(51) Int. Cl.$^7$ ............................................. G01B 5/28
(52) U.S. Cl. ................................ 701/80; 701/37; 73/105
(58) Field of Search ............................... 701/1, 80, 37, 701/71; 702/167, 182; 73/104, 105

(56) References Cited

U.S. PATENT DOCUMENTS

| | | | |
|---|---|---|---|
| 4,422,322 | * 12/1983 | Spangler | 73/105 |
| 4,651,290 | * 3/1987 | Masaki et al. | 73/105 |
| 4,666,218 | * 5/1987 | Masaki et al. | 701/80 |
| 4,809,197 | * 2/1989 | Tashiro et al. | 73/105 |
| 4,837,727 | * 6/1989 | Tashiro et al. | 73/105 |
| 4,883,325 | * 11/1989 | Shimanuki et al. | 701/80 |
| 4,984,163 | * 1/1991 | Kuwana et al. | 73/105 |
| 5,085,288 | * 2/1992 | Shiraishi et al. | 701/80 |
| 5,123,715 | * 6/1992 | Okubo | 701/80 |
| 5,229,955 | * 7/1993 | Nishiwaki et al. | 701/80 |
| 5,833,328 | * 11/1998 | Matsuda | 701/80 |
| 5,900,819 | 5/1999 | Kyrtsos | 340/576 |

* cited by examiner

*Primary Examiner*—Gary Chin
(74) *Attorney, Agent, or Firm*—Carlson, Gaskey & Olds

(57) ABSTRACT

A method and system for determining the condition of a road travelled by a vehicle includes a sensor for sensing a speed of the vehicle and an accelerometer for sensing a vertical acceleration of the vehicle. A central processing unit have control logic programmed therein determines a first road profile interval having upper and lower threshold values based on the speed of the vehicle and determines the condition of the road based on the vertical acceleration and the first road profile interval.

28 Claims, 2 Drawing Sheets

METHOD AND SYSTEM FOR DETERMINING CONDITION OF ROAD

BACKGROUND OF THE INVENTION

The invention relates to methods and systems for determining the condition of the road travelled by an automotive vehicle for use in controlling the vehicle.

Various methods have been developed to aid a driver of a vehicle to stop on unstable road conditions, such as icy or water-covered roads. For example, anti-lock brake systems work to eliminate, or at least minimize, slippage of the wheels when the brakes are applied so as to maintain control of the vehicle on undesirable surface conditions. However, in these instances, it is not until the brakes are applied that the condition of the road is determined. The braking must then be adjusted even further.

Thus, it is desirable to determine the condition of the road prior to applying brakes to the wheels so that proper braking is initiated at the beginning of the braking cycle. It is also desirable to warn the driver of undesirable road conditions so that appropriate acceleration, steering and braking can be applied accordingly.

SUMMARY OF THE INVENTION

It is an object of the present invention to provide a method and system for determining the condition of the road travelled by a vehicle.

It is yet another object of the present invention to provide a method and system for providing a visual warning to the driver of the vehicle when the speed of the vehicle is inappropriate based on the road conditions.

Still further, it is an object of the present invention to provide a method and system for controlling braking of the vehicle based on a-priori knowledge of the condition of the road.

A method and system for determining the condition of a road travelled by a vehicle includes a sensor for sensing a speed of the vehicle and an accelerometer for sensing a vertical acceleration of the vehicle. A central processing unit determines a first road profile interval having upper and lower threshold values based on the speed of the vehicle and the condition of the road based on the vertical acceleration and the first road profile interval. Based on whether the road is rough or smooth, the vehicle's suspension or braking system can be controlled accordingly.

The first road profile interval is based on the mean vehicle speed and maximum and minimum vertical acceleration values representative of rough and smooth road conditions, respectively. If the sensed vertical acceleration exceeds the maximum vertical acceleration value, a rough road condition is determined. On the other hand, if the sensed vertical acceleration is less than the minimum vertical acceleration value, a smooth road surface is detected.

In a preferred embodiment, a second road profile interval having upper and lower threshold values representative of the maximum and minimum vertical acceleration distributions corresponding to rough and smooth roads, respectively, is utilized. The condition of the road is further determined based on a comparison of the vertical acceleration and the second road profile threshold if the vertical acceleration falls within the first road profile interval. In this embodiment, a standard deviation of the vertical acceleration is determined. If the standard deviation of the vertical acceleration exceeds the upper threshold value of the second road profile interval, then a rough road condition is determined. Again, if the standard deviation of the vertical acceleration is less than the lower threshold value of the second road profile interval, a smooth road condition is detected.

In yet another embodiment, a dynamic coefficient of friction corresponding to the minimum coefficient of friction required to achieve a particular change in vehicle speed is determined. The dynamic coefficient of friction is compared to a predetermined threshold, and if the dynamic coefficient of friction is less than the predetermined threshold, the vehicle is travelling at an excessive speed.

The dynamic coefficient of friction is determined in one of two ways. In a first method, a fore/aft acceleration of the vehicle is sensed and the dynamic coefficient of friction is determined based on a current value of the fore/aft acceleration and a previous value of the fore/aft acceleration. In an alternative method, a distance traveled by a pair of wheels of the vehicle is determined over a predetermined time interval. The dynamic coefficient of friction is determined based on the distance traveled by the pair of wheels and the speed of the vehicle over the predetermined time interval.

The dynamic coefficient of friction can then be displayed to the driver of the vehicle for use in controlling the vehicle. The central processing unit can also control the vehicle in response to the dynamic coefficient of friction. Here, a braking system of the vehicle can be controlled to avoid slippage on a smooth, icy road.

These and other features of the present invention can be understood from the following specification and drawings.

DETAILED DESCRIPTION OF A PREFERRED EMBODIMENT

Figure 1:
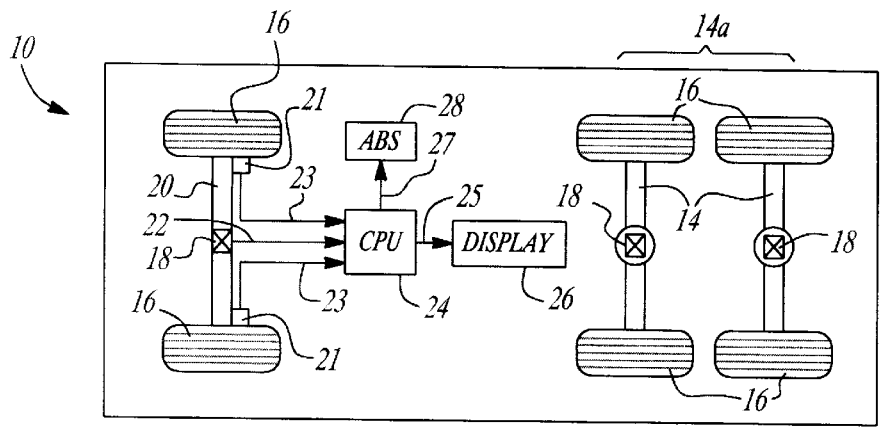
FIG. 1 is a schematic view of a vehicle incorporating the present invention.

A vehicle is shown generally at 10 in FIG. 1. The vehicle typically includes a front non-drive steering axle 12 and a rear axle 14 having wheels 16 attached thereto. Alternatively, the rear axle 14 may be a tandem axle as illustrated at 14a. The axles 12, 14 and wheels 16 support the vehicle 10 on the road via a conventional suspension system. A sensor 18 is placed adjacent to an axle center 20 on the front non-drive steering axle 12. The sensor 18 measures movement of the front non-drive steering axle 12.

The sensor 18 can be configured to monitor various different axle characteristics. Preferably, the sensor 18 is a standard accelerometer which measures axle accelerations and is well known in the art. An acceleration signal is produced in response to measuring the acceleration of the axle 12. The vertical and fore-aft accelerations of the axle are typically measured by the accelerometer 18. The sensor 18 is preferably placed near the axle center 20, but may also be placed off-center. However, the data collected may have to be adjusted to account for the imbalance. Also, the sensor is preferably placed on the front non-drive steering axle 12, however, it could be placed on any axle in the vehicle 10. Also, the inventive system could utilize multiple sensors 18 on multiple axles. When the sensor 18 measures the acceleration of the axle 12, an acceleration signal 22 is produced and sent to a central processing unit (CPU) 24 having control logic programmed therein.

Furthermore, the vehicle 10 includes conventional wheel speed sensors 21 mounted at each wheel 16 for measuring the wheel speed, or vehicle speed. Although, wheel speed sensors 21 are illustrated as being associated with the front wheels 16, wheel speed sensors 21 may alternatively or additionally be associated with the rear wheels. Wheel speed sensors 21 generate wheel speed signals 23 that are also transmitted to CPU 24.

The acceleration signal 22 is compared to vehicle speed-dependent profiles at CPU 24 to determine the condition of the road being traveled by the vehicle 10. A control signal 25 may be sent to an indicator 26 to provide a warning to the driver if the acceleration signal 22 exceeds or falls below the predetermined profile. The indicator 26 can be either a visual display located in the passenger compartment of the vehicle and/or an audio device.

A suspension control signal may also be generated by CPU 24 to control the suspension system of the vehicle. That is, if the CPU 24 detects a rough road condition, a control signal is generated to soften the suspension system. On the other hand, if the CPU 24 detects a smooth road condition, a control signal is generated to stiffen the suspension system.

Still further, another use in determining the road condition is to control braking of the vehicle 10. In this application, the CPU 24 sends a control signal 27 to a conventional ABS (anti-lock braking system) 28. Typically, an ABS 28 detects slippage at time of brake application and adjusts braking accordingly. However, the present invention allows the ABS 28 to have a-priori knowledge of the road condition before the brakes are applied so that appropriate braking can be initiated at first application of the brakes.

Furthermore, the a-priori knowledge of the road condition before braking is also useful in collision avoidance. That is, if predetermined collision avoidance goals are established, such as stopping the vehicle at least 20 feet from a detected object when the object is travelling at 60 mph, then the amount and timing of braking can be anticipated to achieve this goal.

Figure 2A:
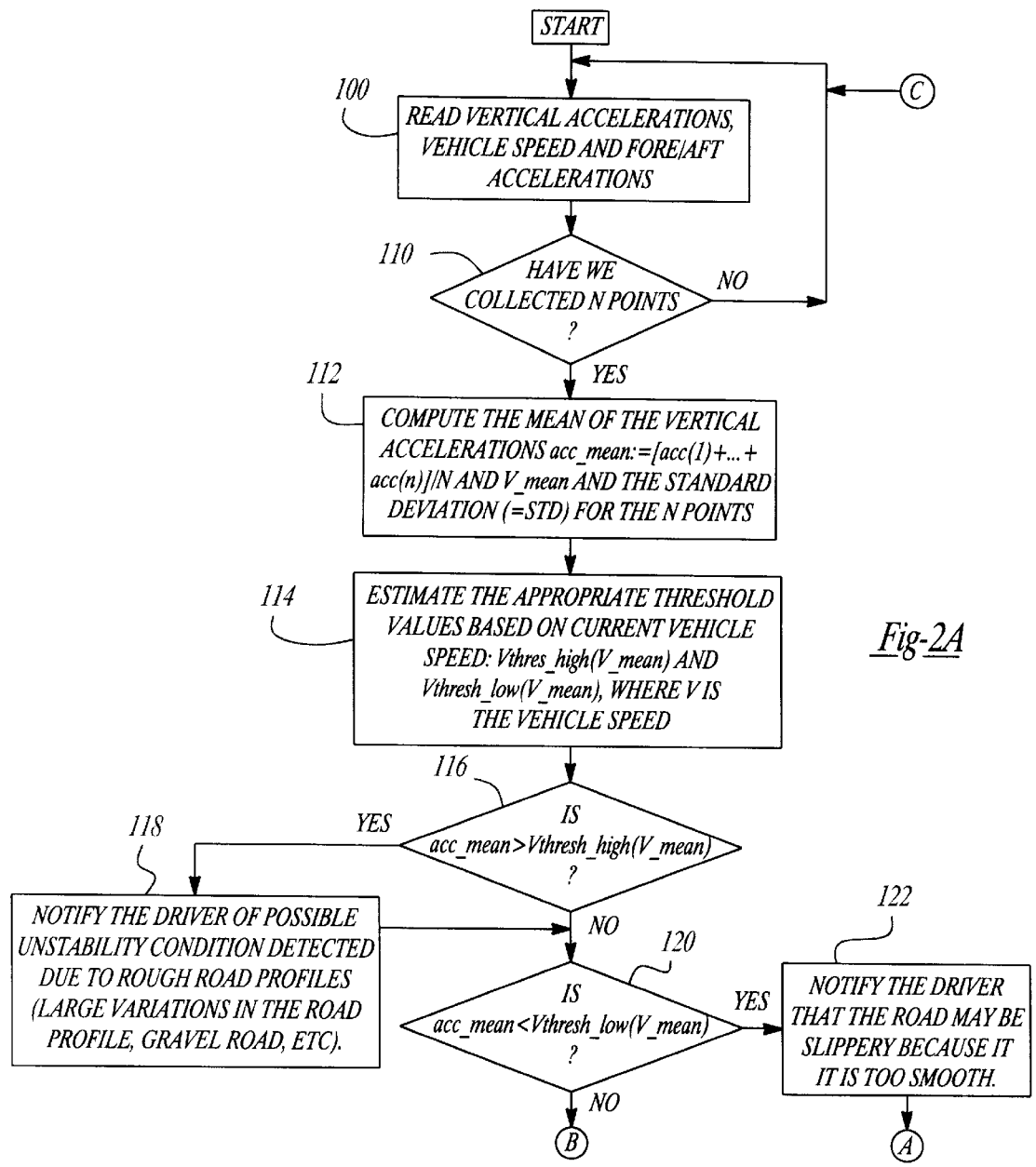
FIGS. 2a–2b are flow diagrams illustrating the basic steps associated with the method of the present invention.
Figure 2B:
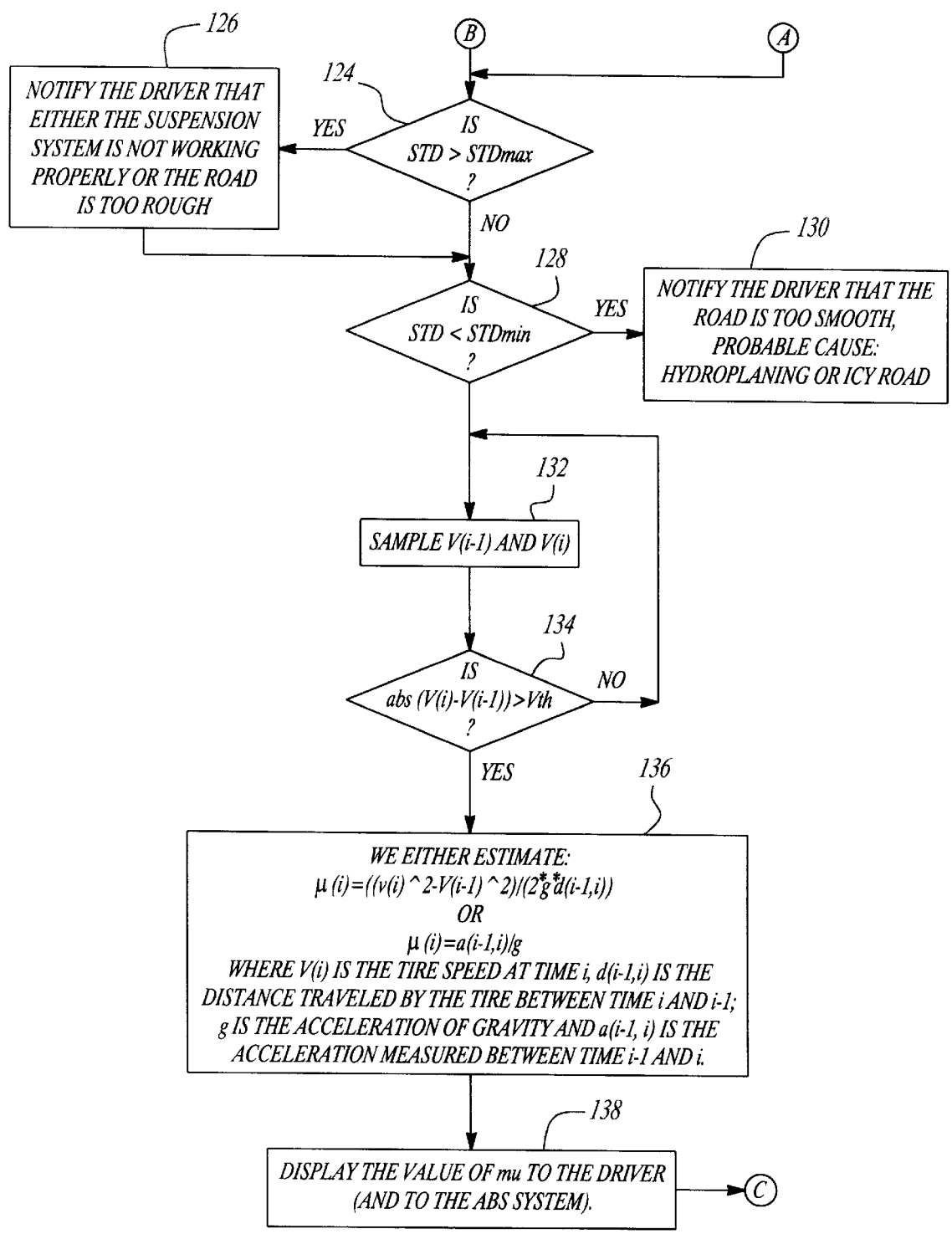

The inventive method is described in greater detail below and is shown in a flow diagram in FIGS. 2a–2b. At block 100, various input parameters are measured, such as vehicle speed, vertical acceleration and fore/aft acceleration. Vehicle speed is measured via wheel speed sensors 21, and vertical and fore/aft accelerations are measured via accelerometer 18. This sampling is continued until a predetermined number of samples are collected, as shown at conditional block 110. The sampling could be a fixed number of samples or could be a moving window, such as 10<N<100 at 1 sample per second.

Next, the mean value of the vertical acceleration, acc_mean, and the vehicle speed, V_mean, is determined, as shown at block 112. Also, the standard deviation, STD, of the vertical acceleration is determined at this time. These values will be compared to road profile threshold intervals, as described below.

A set of first acceleration threshold values are determined at block 114 based on the current vehicle speed. These upper, thresh_high_accel, and lower, thresh_low_accel, values are empirically determined for a particular type of vehicle and stored in a ROM (read only memory) for reference. That is, for specific vehicle speeds, vertical accelerations are monitored to determine at what minimum and maximum accelerations are smooth and rough road conditions, respectively, are encountered. For example, at some particular vehicle speed, a vertical acceleration variation of +/−1 G or less would indicate that the road is very smooth, maybe slippery, while a vertical acceleration variation of +/−10 G's or more would indicate that the road is very bumpy.

Thus, the mean vertical acceleration is then compared to the high acceleration threshold, as shown at conditional block 116. If the high acceleration limit is exceeded, then the road profile corresponds to rough road conditions, as shown at block 118. At this time, an appropriate notification can be provided to the driver of the vehicle and the suspension system is controlled accordingly. If the high acceleration limit is not exceeded, then the mean acceleration is compared to the low acceleration threshold value, as shown at conditional block 120. If the current acceleration is less than the minimum limit, then the road profile corresponds to smooth road conditions, as shown at block 122. Again, appropriate notification is provided to the driver and the suspension system is controlled accordingly.

If the mean vertical acceleration falls within the high and low acceleration values, then a standard deviation (STD) of the vertical acceleration may be compared to appropriate maximum and minimum values, as shown at conditional block 124, to further identify the condition of the road. As with the high and low acceleration values, the maximum and minimum standard deviation limits are also empirically determined and are representative of the maximum and minimum vertical acceleration distributions corresponding to rough and smooth roads, respectively. Preferably, the ratio between the allowed STD's is proportional to the ratio between the allowed vertical accelerations. The STDmax and STDmin values may be determined in one of several ways including, but not limited to, determining characteristic forcing functions for different roads, vehicle weights and vehicle speeds, and determining a mathematical model that models the road characteristics/profiles as forcing functions to the vehicle.

Continuing with block 126, if the standard deviation exceeds the maximum value, then a determination is made that the road is rough. If the vertical accelerations are inconsistent, the standard deviation will be high. This occurs when input to the accelerometer 18 is varied, which in turn occurs when the road is very rough. On the other hand, if the standard deviation is less than the minimum value, as shown at conditional block 128, a determination is made that the road is smooth. That is, if the vertical accelerations are within the same values, the standard deviation will be near zero due to the fact that the road is smooth and not inducing any variations on the data collected by the accelerometer 18.

Finally, the method proceeds to estimate the dynamic coefficient of friction, i.e., mu, corresponding to the minimum coefficient required to achieve the change in velocity the vehicle experienced in order to determine if the vehicle is travelling at an unsafe speed. Mu can be determined in one of two ways, either based on the speed of the vehicle or based on the measured fore/aft acceleration. When estimating mu based on the vehicle speed, vehicle speed is sampled until a value, Vth, larger than the sampling error of the system is exceeded, as shown at block 132 and conditional block 134. That is, the sample difference must be large enough to avoid computing results based on measurement errors. For example, if the 2 mph per sample can be resolved, then Vth must be larger than 2 mph.

Mu can then be estimated, as shown at block 136, as follows:

$$mu(i) = ((V(i)^2 - V(i-1)^2)/(2*g*d(i-1,i))),$$

where $V(i)$ is the wheel speed at time $i$, $d(i-1,i)$ is the distance travelled by the wheel between time $i$ and $i-1$, and $g$ is the acceleration due to gravity.

Alternatively, mu can be estimated based on the fore/aft acceleration as follows:

$$mu(i) = a(i-1,i)/g,$$

where a(i−1,i) is the fore/aft acceleration measured between time i−1 and i, and g is the acceleration due to gravity.

The value of mu is then displayed to the driver and/or supplied to the ABS 28, as shown at block 138. In a preferred embodiment, the computed value of mu is displayed in a bar graph, or some other similar display, having a range of 0 to 1. If, for instance, the output is normally between 0.4 and 0.8, the driver will recognize the vehicle is not travelling safely if mu is 0.3 or below. The driver will then consciously slow down to avoid an accident. Alternatively, mu is transmitted to the ABS 28 for use in determining how to control braking of the wheels 16 prior to the brakes being initially applied.

Still further, the computed value of mu may be sent to CPU 24 that could determine if the vehicle is travelling too fast if mu is consistently estimated as being low. The CPU 24 would then slow the vehicle down accordingly.

Preferred embodiments have been disclosed. However, a worker in this art would recognize that modifications would come within the scope of this invention. Thus, the following claims should be studied to determine the scope and content of this invention.

What is claimed is:

1. A method for determining the condition of a road travelled by an automotive vehicle, the method comprising:
   sensing a speed of the vehicle;
   sensing a vertical acceleration of the vehicle;
   determining a first road profile interval having upper and lower threshold values based on the speed of the vehicle; and
   determining the condition of the road based on the vertical acceleration and the first road profile interval.

2. The method as recited in claim 1 wherein said step of determining the first road profile interval comprises:
   determining a mean vehicle speed; and
   determining a maximum and minimum vertical acceleration value representative of a rough and smooth road, respectively, based on the mean vehicle speed.

3. The method as recited in claim 2 wherein said step of determining the condition of the road comprises:
   determining a rough road condition if the sensed vertical acceleration exceeds the maximum vertical acceleration value; and
   determining a smooth road condition if the sensed vertical acceleration is less than the minimum vertical acceleration value.

4. The method as recited in claim 1 further comprising:
   determining a second road profile interval having upper and lower threshold values representative of the maximum and minimum vertical acceleration distributions corresponding to rough and smooth roads, respectively; and
   determining the condition of the road based on the vertical acceleration and the second road profile interval if the vertical acceleration falls within the first road profile interval.

5. The method as recited in claim 4 wherein said step of determining the condition of the road comprises:
   determining a standard deviation of the vertical acceleration;
   determining a rough road condition if the standard deviation of the vertical acceleration exceeds the upper threshold value of the second road profile interval; and
   determining a smooth road condition if the standard deviation of the vertical acceleration is less than the lower threshold value of the second road profile interval.

6. The method as recited in claim 1 further comprising:
   determining a dynamic coefficient of friction corresponding to a minimum coefficient of friction required to achieve a particular change in vehicle speed;
   comparing the dynamic coefficient of friction to a predetermined threshold; and
   determining the vehicle is travelling at an excessive vehicle speed if the dynamic coefficient of friction is less than the predetermined threshold.

7. The method as recited in claim 6 wherein said step of determining the dynamic coefficient of friction comprises:
   sensing a fore/aft acceleration of the vehicle; and
   determining the dynamic coefficient of friction based on a current value of the fore/aft acceleration and a previous value of the fore/aft acceleration.

8. The method as recited in claim 6 wherein said step of determining the dynamic coefficient of friction comprises:
   determining a distance traveled by a pair of wheels of the vehicle over a predetermined time interval; and
   determining the dynamic coefficient of friction based on the distance traveled by the pair of wheels and the speed of the vehicle over the predetermined time interval.

9. The method as recited in claim 6 further comprising displaying the dynamic coefficient of friction.

10. The method as recited in claim 6 further comprising controlling the vehicle based on the dynamic coefficient of friction.

11. The method as recited in claim 10 wherein said step of controlling the vehicle includes controlling a braking system of the vehicle.

12. The method as recited in claim 1 further comprising controlling the vehicle based on the condition of the road.

13. The method as recited in claim 12 wherein said step of controlling the vehicle includes controlling a suspension system of the vehicle.

14. The method as recited in claim 12 wherein said step of controlling the vehicle includes controlling a braking system of the vehicle.

15. A system for determining the condition of a road travelled by an automotive vehicle, the system comprising:
    a sensor for sensing a speed of the vehicle;
    an accelerometer for sensing a vertical acceleration of the vehicle; and
    a central processing unit, coupled to the sensor and the accelerometer, having control logic programmed therein for determining a first road profile interval having upper and lower threshold values based on the speed of the vehicle and determining the condition of the road based on the vertical acceleration and the first road profile interval.

16. The system as recited in claim 15 wherein the central processing unit, in determining the first road profile interval, is further operative to determine a mean vehicle speed and determining a maximum and minimum vertical acceleration value representative of a rough and smooth road, respectively, based on the mean vehicle speed.

17. The system as recited in claim 16 wherein the central processing unit, in determining the condition of the road, is further operative to determine a rough road condition if the sensed vertical acceleration exceeds the maximum vertical acceleration value and determining a smooth road condition if the sensed vertical acceleration is less than the minimum vertical acceleration value.

18. The system as recited in claim 15 wherein the central processing unit is further operative to determine a second road profile interval having upper and lower threshold values representative of the maximum and minimum vertical acceleration distributions corresponding to rough and smooth roads, respectively, and determine the condition of the road based on the vertical acceleration and the second road profile interval if the vertical acceleration falls within the first road profile interval.

19. The system as recited in claim 18 wherein the central processing unit, in determining the condition of the road, is further operative to determine a standard deviation of the vertical acceleration, determine a rough road condition if the standard deviation of the vertical acceleration exceeds the upper threshold value of the second road profile interval, and determine a smooth road condition if the standard deviation of the vertical acceleration is less than the lower threshold value of the second road profile interval.

20. The system as recited in claim 15 wherein the central processing unit is further operative to determine a dynamic coefficient of friction corresponding to a minimum coefficient of friction required to achieve a particular change in vehicle speed, compare the dynamic coefficient of friction to a predetermined threshold, and determine the vehicle is travelling at an excessive vehicle speed if the dynamic coefficient of friction is less than the predetermined threshold.

21. The system as recited in claim 20 further comprising a second accelerometer for sensing a fore/aft acceleration of the vehicle, and wherein the central processing unit, in determining the dynamic coefficient of friction, is further operative to determine the dynamic coefficient of friction based on a current value of the fore/aft acceleration and a previous value of the fore/aft acceleration.

22. The system as recited in claim 20 wherein the central processing unit, in determining the dynamic coefficient of friction, is further operative to determine a distance traveled by a pair of wheels of the vehicle over a predetermined time interval and determine the dynamic coefficient of friction based on the distance traveled by the pair of wheels and the speed of the vehicle over the predetermined time interval.

23. The system as recited in claim 20 further comprising a display coupled to the central processing unit for displaying the dynamic coefficient of friction.

24. The system as recited in claim 20 wherein the central processing unit is further operative to control the vehicle based on the dynamic coefficient of friction.

25. The system as recited in claim 24 wherein the central processing unit in, controlling the vehicle, includes controlling a braking system of the vehicle.

26. The system as recited in claim 15 wherein the central processing unit is further operative to control the vehicle based on the condition of the road.

27. The system as recited in claim 26 wherein the central processing unit, in controlling the vehicle, is further operative to control a suspension system of the vehicle.

28. The system as recited in claim 26 wherein the central processing unit, in controlling the vehicle, is further operative to control a braking system of the vehicle.

* * * * *